US009842224B2

(12) United States Patent
Alameh et al.

(10) Patent No.: US 9,842,224 B2
(45) Date of Patent: Dec. 12, 2017

(54) PORTABLE ELECTRONIC DEVICE PROXIMITY SENSORS AND MODE SWITCHING FUNCTIONALITY

(71) Applicant: Motorola Mobility LLC, Chicago, IL (US)

(72) Inventors: Rachid M Alameh, Crystal Lake, IL (US); Roger W Ady, Chicago, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 15 days.

(21) Appl. No.: 14/721,631

(22) Filed: May 26, 2015

(65) Prior Publication Data

US 2016/0350553 A1 Dec. 1, 2016

(51) Int. Cl.
*G06F 21/00* (2013.01)
*G06F 21/62* (2013.01)
*G06F 21/74* (2013.01)

(52) U.S. Cl.
CPC .......... *G06F 21/6245* (2013.01); *G06F 21/74* (2013.01)

(58) Field of Classification Search
CPC ................................ G06F 21/00; G06F 21/10

USPC ...................................................... 726/26–30
See application file for complete search history.

(56) References Cited

U.S. PATENT DOCUMENTS

| 2005/0055568 | A1* | 3/2005 | Agrawala | ........... G07C 9/00111 |
| | | | | 726/2 |
| 2005/0187712 | A1* | 8/2005 | Callaghan | ............. B66B 5/0031 |
| | | | | 701/301 |

* cited by examiner

*Primary Examiner* — Anthony Brown
(74) *Attorney, Agent, or Firm* — Philip H. Burrus, IV

(57) ABSTRACT

An electronic device includes a housing. One or more processors are operable with a plurality of proximity sensor components that can be disposed behind a grille defining a plurality of reception beams having a cumulative beam reception angle. The cumulative beam reception angle of any one proximity sensor component overlaps the cumulative beam reception angle of at least one other proximity sensor component. The one or more processors can detect whether a single person or a plurality of people are within a thermal reception radius of the electronic device. Where the single person is within the thermal reception radius, the one or more processors can operate the electronic device in a first mode of operation, and where the plurality of people are within the thermal reception radius, operate the electronic device in a second mode of operation.

20 Claims, 12 Drawing Sheets

PORTABLE ELECTRONIC DEVICE PROXIMITY SENSORS AND MODE SWITCHING FUNCTIONALITY

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. Electronic devices employ such proximity sensors to manage audio and video device output.

While prior art proximity detectors are useful for determining when an object is close to an electronic device, prior art proximity detectors generally have difficulty determining where an object may be relative to the device. Additionally, prior art proximity sensors are unable to determine how many objects are near the device. It would be advantageous to have an improved proximity sensor and associated systems and devices.

Figure 1:
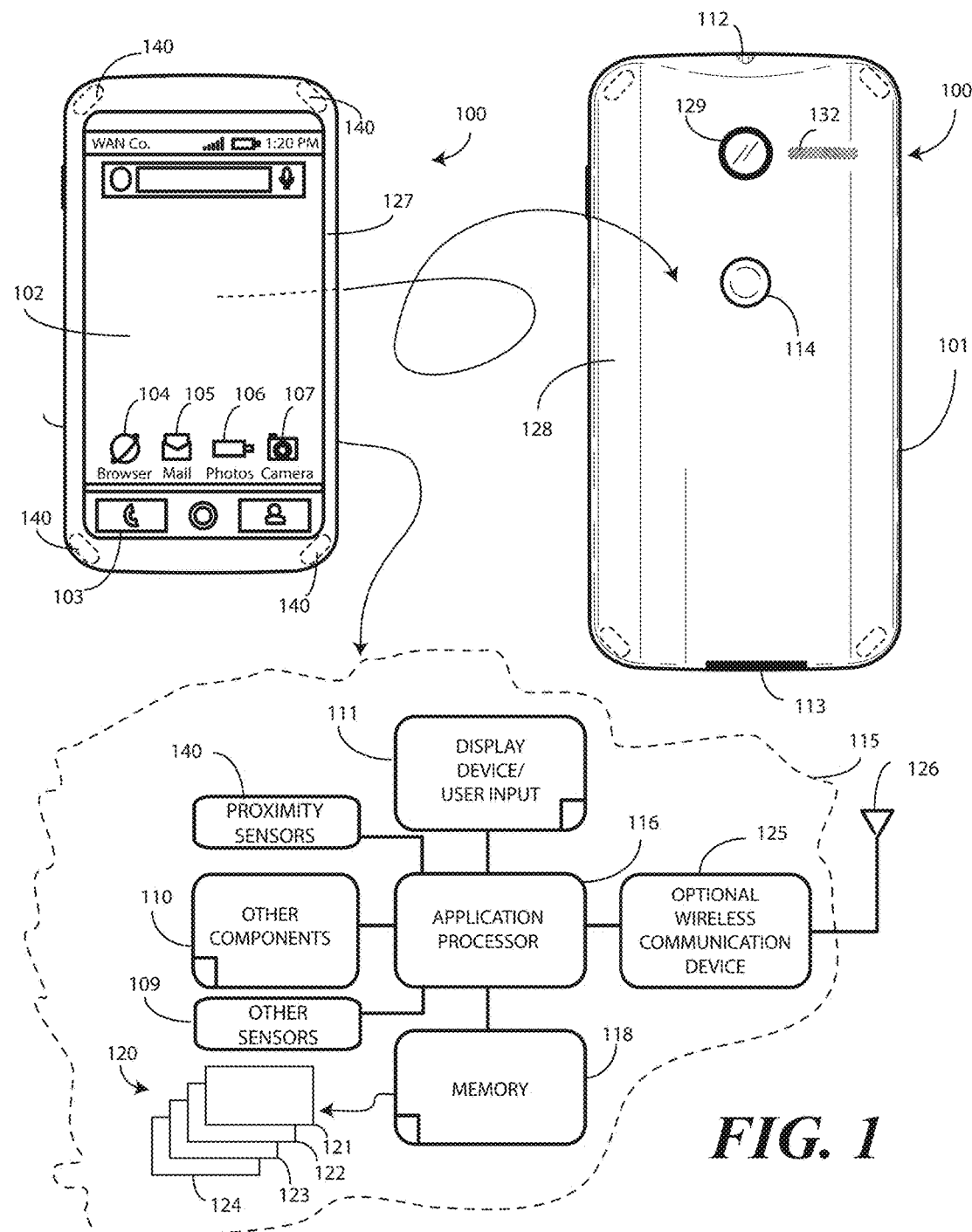
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors to control device operation as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, each proximity sensor component is disposed about a perimeter of the housing along minor faces of the housing. For example, in one explanatory embodiment four proximity sensor components are disposed at the corners of the housing. In other embodiments, additional proximity sensors can be included. For example, in another embodiment four proximity sensors can be disposed at corners of the device while four additional proximity sensors are disposed along the sides of the housing. This results in eight proximity sensors being used. While the use of additional proximity sensor components can help to increase location and distance resolution, they also increase the cost. Thus, in one embodiment only four proximity sensor components, disposed at the corners of the electronic device, are used.

In one embodiment, each proximity sensor component is disposed behind a grille defining a plurality of distinct reception beams. The plurality of reception beams has associated therewith a cumulative reception angle. In one embodiment, to achieve a full 360-degree proximity detection coverage about the device, the cumulative reception angle is obtuse, i.e., greater than ninety degrees, such that the cumulative beam reception angle of any one proximity sensor component overlaps the cumulative beam reception angle of at least one other proximity sensor component. In one embodiment, where four proximity sensor components are disposed at the corners of the housing, the cumulative beam reception angle of any one proximity sensor component overlaps at least two other cumulative beam reception angles of at least two other proximity sensor components to provide 360-degree coverage.

In one embodiment, the one or more processors operate in conjunction with the plurality of proximity detector components to detect whether a single person or a plurality of people are within a thermal reception radius of the electronic device. The one or more processors can be configured to operate differently depending upon whether a single person or multiple people are near the electronic device. For example, where there is a single person within the thermal reception radius, the one or more processors can operate the electronic device in a first mode of operation. Where there is a plurality of people within the thermal reception radius, the one or more processors can operate the electronic device in a second mode of operation.

In one embodiment, the first mode of operation is a normal mode of operation, while the second mode of operation is a privacy mode of operation. Embodiments of the disclosure contemplate that a user may not want passersby to be privy to private information annunciated from a loudspeaker or presented on the display of an electronic device. This is especially true when the audible or visible output includes an enunciation of personal information. With this unforeseen problem in mind, methods and apparatuses for detecting when multiple people, i.e., a user and at least one third party, are within a thermal reception radius of the electronic device, one or more processors can cause the device to enter a privacy or discrete mode of operation, rather than the normal mode of operation.

The privacy mode of operation can take a variety of different forms. In one embodiment, when in the privacy mode of operation the one or more processors will present an alert of incoming messages on the display, while precluding the content of messages from being presented on the display. Illustrating by example, presume a female user has a date with her fiancée, Buster. She may not want third parties to know the details of the date. Accordingly, when the plurality of proximity sensor components determines that multiple parties are within a thermal reception radius of the device, and Buster sends a message to the user, the display—when operating in the privacy mode—may read only "Message From Buster" while precluding the presentation of the contents of the message, e.g., "I am looking forward to our date tonight at 7 PM at Mac's Restaurant." This prevents the third party from eavesdropping into the user's affairs. Had Buster labeled, stamped, or otherwise marked the message as "private," it would not have even appeared in one embodiment when operating in the privacy mode.

In another embodiment, the one or more processors can disable the display of some or all text messages or chat messages when operating in the privacy mode. In another embodiment, the one or more processors can lock the display when operating in the privacy mode, even if the electronic device would otherwise be unlocked due to a nearby "trusted device" such as a paired smart watch or headset. For instance, if the electronic device is unlocked by a nearby trusted Bluetooth™ device, in one embodiment when a plurality of people are detected within the thermal reception radius the one or more processors could lock the electronic device to "step up" security a notch so that no third party tampers with the device while the user is not watching.

In yet another embodiment, the one or more processors can allow access to non-sensitive information, such as Internet search engines, while precluding access to sensitive or private information, such as electronic mail, when operating in the privacy mode. Illustrating by example, embodiments of the disclosure contemplate that the user may not care if a third party uses their device to search for the answer to the question, "How tall is the Sears Tower?" Accordingly, when in the privacy mode access to an Internet search engine may be granted so the third party can search for this answer. However, the user may not want a third party to read electronic mail correspondence from their doctor giving a medical diagnosis. Similarly, the user may not want a third party to read a "Dear John" email from their significant other breaking up with them, or a communication from their significant other using expletives after the user forgot an anniversary. Accordingly, when operating in the privacy mode the one or more processors may allow access to non-sensitive applications while protecting sensitive and/or private applications when operating in the privacy mode.

In yet another embodiment, the one or more processors may override location sensors and beacons when operating in the privacy mode. In another embodiment, the one or more processors may present message and electronic mail subjects only on the display, while preventing the presentation of message or electronic mail content when operating in the privacy mode. The user may be able to unlock the electronic device or turn OFF the privacy mode of operation in some cases where they authenticate themselves to the device with a password, fingerprint, or other identifier.

In yet another embodiment, the one or more processors may transition a voice control interface engine operating in the electronic device between a normal mode of operation and a discrete mode of operation. In one embodiment, a voice control interface engine operating in an electronic device is operative to receive a speech command, through a microphone, from a first distance. The voice control interface engine is then to produce, through a loudspeaker and in response to the speech command, an audible output at a first output level. Illustrating by example, the voice control interface engine may be operable to receive voice commands from a user standing two, three, or more feet away and then deliver the audible output to a loudspeaker at a level sufficient for the user to hear it from the same distance. In one embodiment, when operating in the privacy mode, the one or more processors are operable to transition the voice control interface engine to a second mode operative to receive the speech command from a second distance and produce, in response to the speech command, the audible output at a second output level. In one embodiment the second distance is less than the first distance and the second output level is less than the first output level. This second mode of operation, i.e., the discreet mode, allows the user to deliver voice commands with a much lower volume and receive responses at a level that others will not overhear. For instance, when in the discreet mode of operation, the user may whisper voice commands to the microphone, while hearing audible responses from an earpiece speaker rather than a loudspeaker. Embodiments of the disclosure contemplate a user may not care if a third party listens in on the answer to the question, "How tall is the Sears Tower?" However, if the user's voice command had been "play me my voice mail," the user may not want a third party to hear a school teacher's message complaining about their children's behavior.

The examples above of privacy mode operation are illustrative only. Others will be readily obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, a plurality of proximity sensor components 140 can be operable with the one or more processors 116. In one embodiment, the proximity sensor components 140 comprise only signal receivers. In one embodiment, the proximity sensor components 140 comprise infrared receivers. For example, in one embodiment the proximity sensor components 140 comprise signal receivers that receive infrared wavelengths of about 860 nanometers. IN one embodiment, the proximity sensor components 140 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

In one embodiment, each proximity sensor component 140 comprises an infrared signal receiver so as to be able to detect infrared emissions from a person. This is sometimes referred to as a "passive IR system" due to the fact that the person is the active transmitter. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few microamps.

In one embodiment, the signal receiver of each proximity sensor component 140 can operate at various sensitivity levels so as to cause the at least one proximity sensor component 140 to be operable to receive the infrared emissions from different distances. For example, the one or more processors 116 can cause each proximity sensor component 140 to operate at a first "effective" sensitivity so as to receive infrared emissions from a first distance. Similarly, the one or more processors 116 can cause each proximity sensor component 140 to operate at a second sensitivity, which is less than the first sensitivity, so as to receive infrared emissions from a second distance, which is less than the first distance. The sensitivity change can be effected by causing the one or more processors 116 to interpret readings from the proximity sensor component 140 differently. For example, when the electronic device 100 is grabbed, only large readings from the proximity sensor component 140 might cross a less-sensitive threshold set during device grab to be used to control the electronic device 100. In other embodiments, the proximity sensor component 140 can be designed to have changing detection thresholds.

Figure 2:
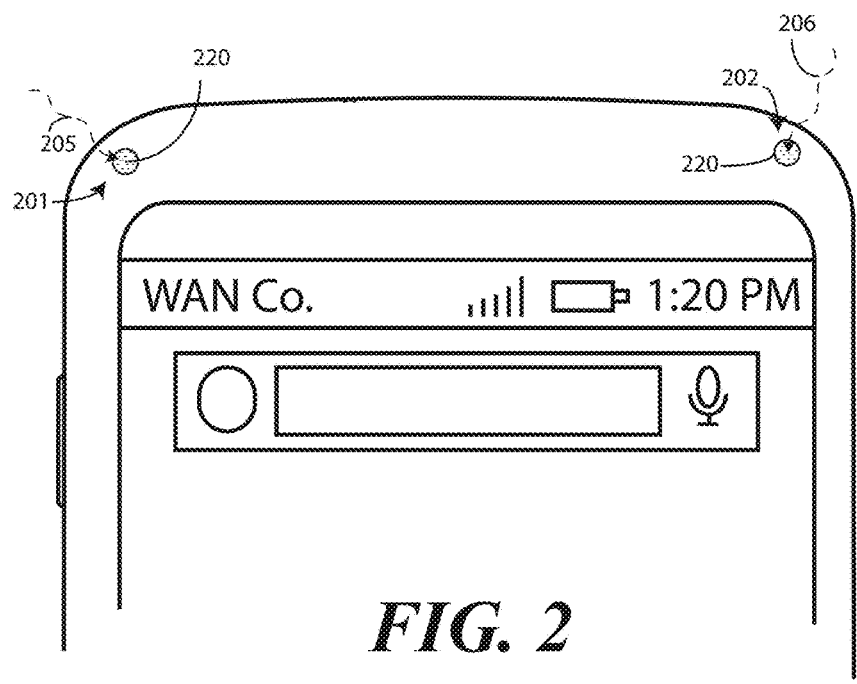
FIG. 2 illustrates explanatory proximity sensor component configurations in accordance with one or more embodiments of the disclosure.

Turning briefly to FIG. 2, illustrated therein are two proximity sensor components 201,202, each disposed at a corner of the electronic device 100. In this embodiment, each proximity sensor component 201,202 comprises a signal receiver 220, such as an infrared photodiode, to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive" proximity sensor.

Figure 3:
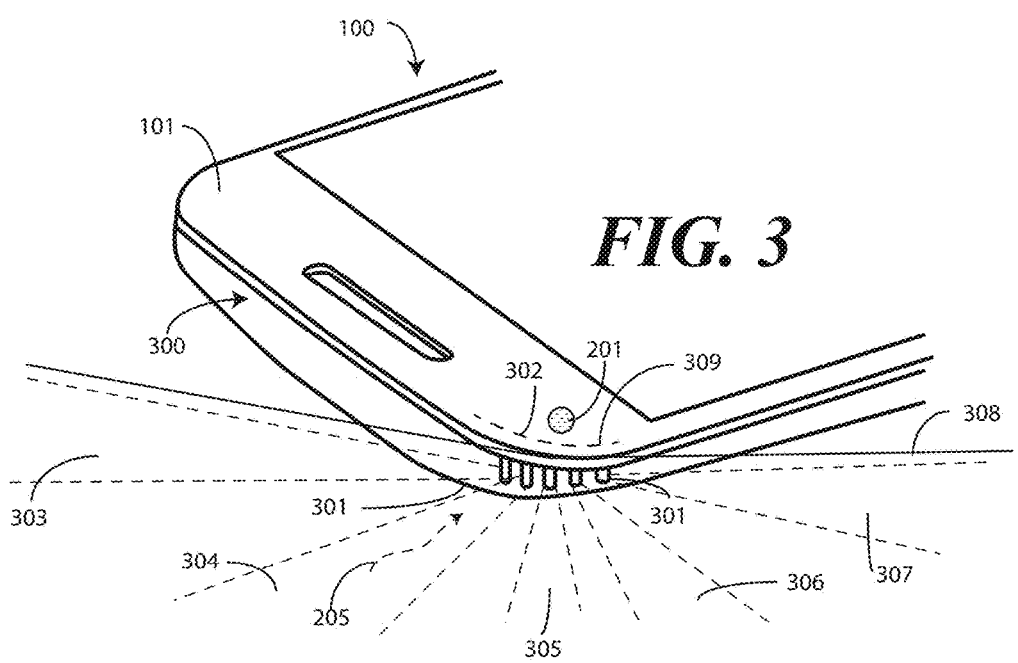
FIG. 3 illustrates one explanatory proximity sensor component configuration in accordance with one or more embodiment of the disclosure.

In one embodiment, the proximity sensor components 201,202 can include at least two sets of components. For example, a first set of components can be disposed at a first corner of the electronic device 100, while another set of components can be disposed at a second corner of the electronic device 100. As shown in FIG. 3, in one embodiment each proximity sensor component 201 can be disposed about a perimeter 300 of the electronic device 100. In one embodiment, the proximity sensor components 201 are disposed at a corner 301 of the electronic device 100. As will be shown with reference to FIG. 4 below, proximity sensor components can be disposed along the sides of the electronic device 100 as well.

In one embodiment, each proximity sensor component 201 is disposed behind a grille 302 that defines one or more apertures through which infrared emissions 205 are received. In one embodiment, the grille 302 can define one or more reception beams 303,304,305,306,307 in which infrared emissions 205 can be received. A cumulative beam reception angle 308 is defined by the angular range at which infrared emissions 205 can be received by a particular proximity sensor component 201. In one or more embodiments, to provide 360-degree coverage about the housing 101 of the electronic device 100, the cumulative beam reception angle for each proximity sensor component 201 is obtuse such that it overlaps with at least one other beam reception angle of at least one other proximity sensor component. This will be shown in more detail below with reference to FIG. 5.

The definition of such reception beams advantageously can enable the proximity sensor components 201 to detect not only the location of an object relative to the housing 101, but also whether one or multiple objects are within a thermal detection radius. Embodiments of the disclosure contemplate that there is a high value in not only detecting presence or motion of a user in a 360-degree coverage area provided by the proximity sensor components 201, but also in determining where the exact user position is relative to electronic device 100. The use of the grille 302 and its corresponding reception beams 303,304,305,306,307 allows for the detection of multiple people about the housing 101 of the electronic device 100, even when those people are close to one another and not just in separate quadrants as in the case of four proximity sensor components (140) as shown in FIG. 1 above. Advantageously, in one or more embodiments this can be accomplished using only four proximity sensor components, which reduces cost and simplifies the overall design. In one embodiment this is accomplished by using the reception beams 303,304,305,306,307 and overlapping the cumulative beam reception angle 308 where multiple proximity sensor components are used to assess user location via triangulation. This will be described in more detail in the subsequent figures. In one or more embodiments, the proximity sensor components 201 can also detect changes across reception beams to detect motion as well.

The apertures of the grille 302 can be used to define various reception beams 303,304,305,306,307. In one embodiment, each grille 302 can be associated with a lens 309 disposed behind, outside, or integrally with the grille 302 to assist with the definition of the reception beams and/or serve as a water dust seal. For example, a polycarbonate lens 309 can be disposed behind the grille 302 and configured as a compound Fresnel lens with a predetermined number of slits, such as five or seven, to assist with the definition of the reception beams.

Figure 4:
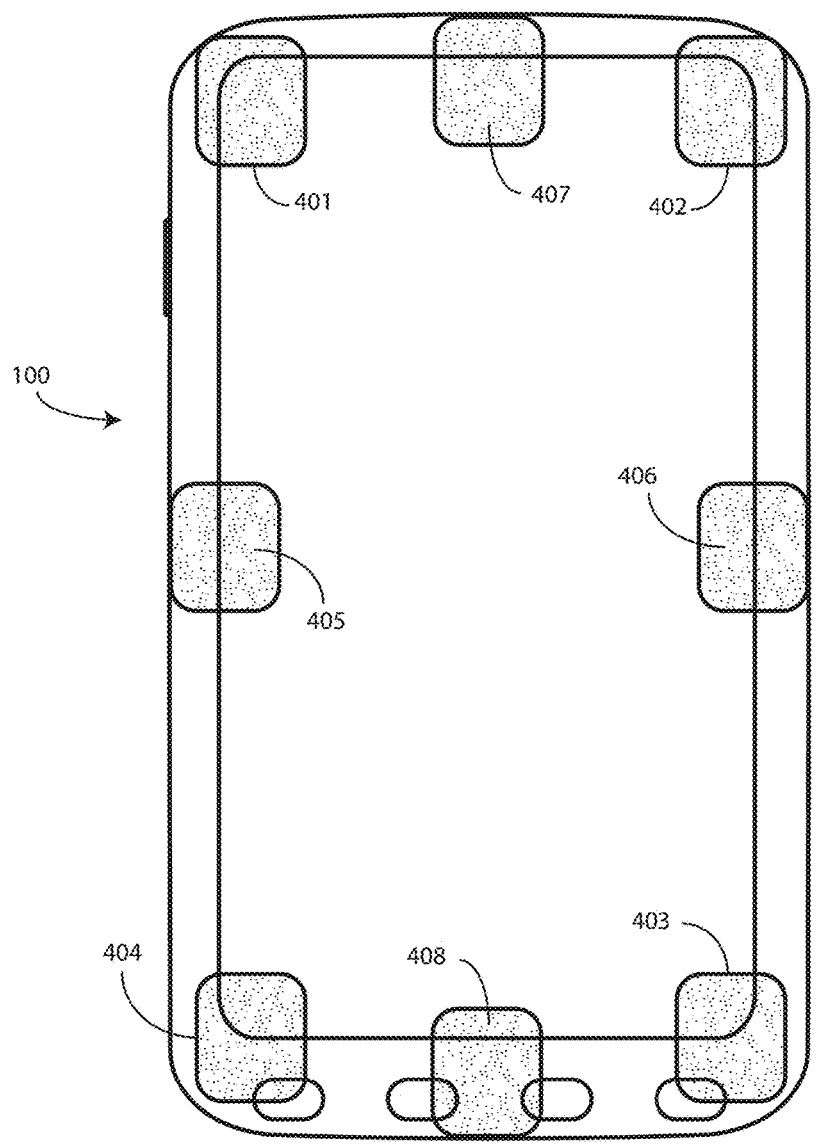
FIG. 4 illustrates explanatory locations along an electronic device where one or more proximity sensor components can be disposed in accordance with one or more embodiments of the disclosure.

It should be noted that corners 301 are not the only location at which proximity sensor components can be located. Turning now to FIG. 4, illustrated therein are some of the many locations at which proximity sensor components may be located. These locations include corner locations 401,402,403,404, edge locations 405,406, and end locations 407,408. Other locations and combinations will be obvious to those of ordinary skill in the art having the benefit of this disclosure.

In one or more embodiments, the plurality of proximity sensor components comprises only four proximity sensor components disposed only at the corner locations 401,402, 403,404 of the housing 101 on a one-proximity sensor component to one corner location basis, respectively. By using obtuse, overlapping cumulative beam reception angles (308), a 360-degree coverage about the housing 101 can be achieved using only four proximity sensor components.

Turning now back to FIG. 1, in one embodiment, the one or more processors 116 may generate commands based on information received from one or more proximity sensor components 140. The one or more processors 116 may generate commands based upon information received from a combination of the one or more proximity sensor components 140 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as an accelerometer or a gyroscope. For example, an accelerometer may be embedded in the electronic circuitry of the electronic device 100 to show vertical orientation, constant tilt and/or whether the device is stationary.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the electronic device 100 can be operated in multiple modes of operation. A first mode, referred to herein as the "default" mode of operation, occurs where the electronic device 100 is operating normally with no usage restrictions. When the proximity sensor components 140 receive an infrared emission from an object external to the housing 101 of the electronic device 100, the one or more processors 116 of the electronic device 100 can detect, with the plurality of proximity sensor components 140, whether a single person or a plurality of people are within a thermal reception radius of the electronic device 100. In one embodiment, where a single person is within the thermal reception radius, the one or more processors 116 can operate the electronic device 100 in the first mode of operation. However, in one embodiment the one or more processors 116 can transition the electronic device 100 to a second mode of operation. As noted above, in one embodiment the second mode of operation is a privacy mode in which one or more restrictions on access to content are applied.

Figure 5:
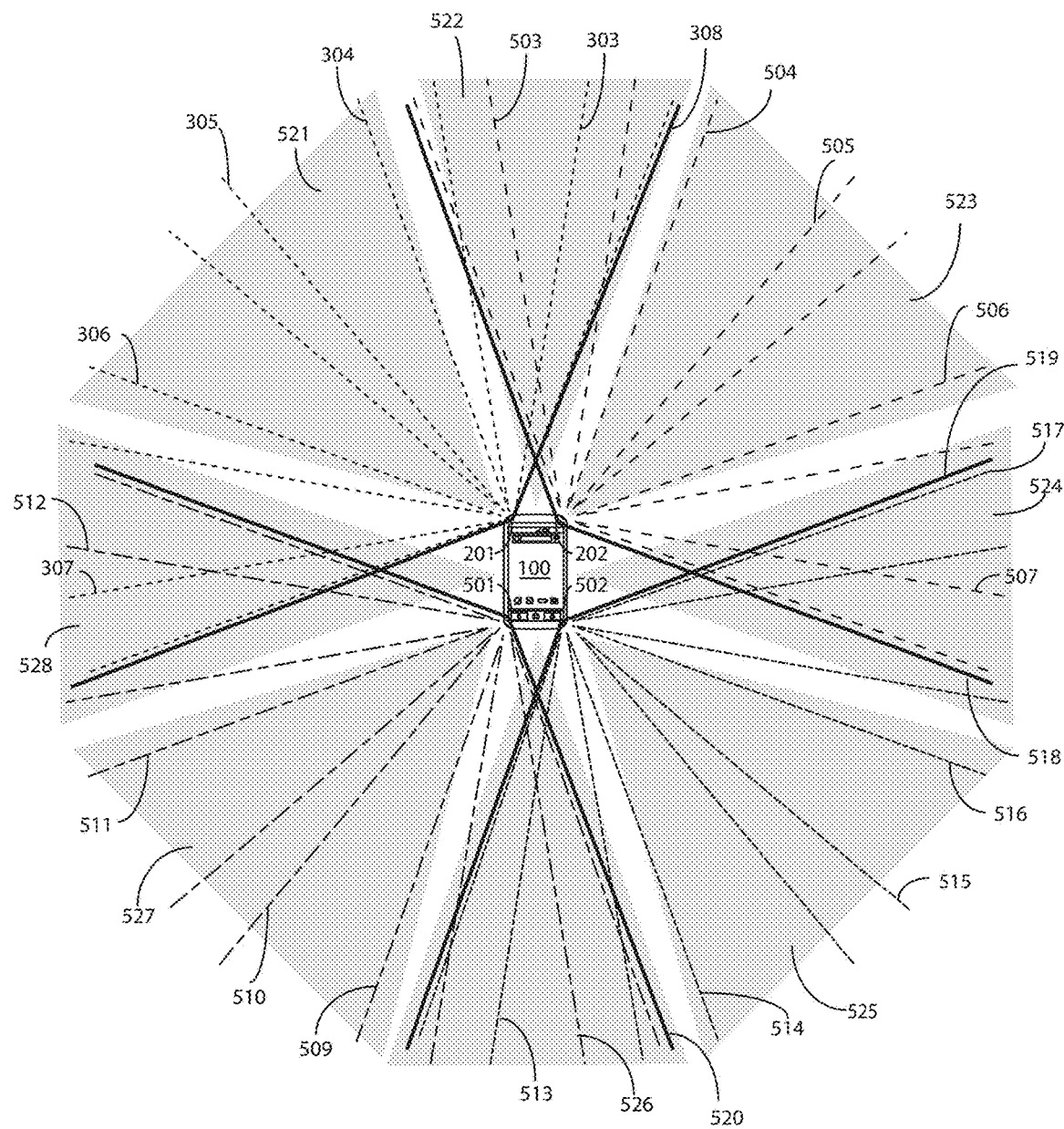
FIG. 5 illustrates an explanatory electronic device having a plurality of proximity sensor components disposed about a perimeter of a device housing, with each proximity sensor component defining a plurality of reception beams having a cumulative reception angle, where at least some reception beams overlap between sensors in accordance with one or more embodiments of the disclosure.

Turning now to FIG. 5, illustrated therein is the electronic device 100 having four proximity sensor components 201, 202,501,502 disposed at corners of the electronic device 100. Each proximity sensor component 201,202,501,502 is disposed behind a grille (302) defining a plurality of reception beams. In this illustrative embodiment, proximity sensor component 201 defines reception beams 303,304,305, 306,307, while proximity sensor component 202 defines reception beams 503,504,505,506,507. Similarly, proximity sensor component 501 defines reception beams 508,509, 510,511,512, and proximity sensor component 502 defines reception beams 513,514,515,516,517.

Each set of reception beams defines a corresponding cumulative beam reception angle. For example, reception beams 303,304,305,306,307 define cumulative beam reception angle 308, while reception beams 503,504,505,506,507 define cumulative beam reception angle 518. Similarly, reception beams 508,509,510,511,512 define cumulative reception angle 519, and reception beams 513,514,515,516, 517 define cumulative reception angle 520.

As noted above, in one embodiment, the cumulative beam reception angle of any one proximity sensor component overlaps the cumulative beam reception angle of at least one other proximity sensor component. In the illustrative embodiment of FIG. 5, the cumulative beam reception angle of the any one proximity sensor component overlaps the cumulative beam reception angle of at least two other proximity sensor components. Illustrating by example, cumulative beam reception angle 308 overlaps both cumulative beam reception angle 518 and cumulative beam reception angle 520. Similarly, cumulative beam reception angle 519 overlaps both cumulative beam reception angle 518 and cumulative beam reception angle 520.

This overlap defines a number of zones 521,522,523,524, 525,526,527,528 from which infrared emissions can be received. The definition of these zones 521,522,523,524, 525,526, 527,528 allows the one or more processors (116) of the electronic device 100 to determine where one or more persons may be located about the electronic device. For example, if a person is standing in zone 521, the only proximity sensor component receiving infrared emissions will be proximity sensor component 201. By contrast, if the person is standing in zone 522, both proximity sensor component 201 and proximity sensor component 202 will receive the infrared emission due to the fact that their respective cumulative beam reception angles 308,518 overlap. A similar analysis can be applied to each zone 521,522, 523,524,525,526,527,528.

Thus, by determining which proximity sensor component, or combination of components, receives the infrared emission, the one or more processors (116) can determine where a person or persons may be located about the electronic device 100. Said differently, in one embodiment the one or more processors (116) can determine whether a single proximity sensor component or multiple proximity sensor components receives the infrared emission to determine a relative location of either a single person or a plurality of people relative to the housing (101) of the electronic device 100. FIG. 5 also illustrates how a 360-degree detection range can be accomplished using only four proximity sensor components 201,202,501,502.

Figure 6:
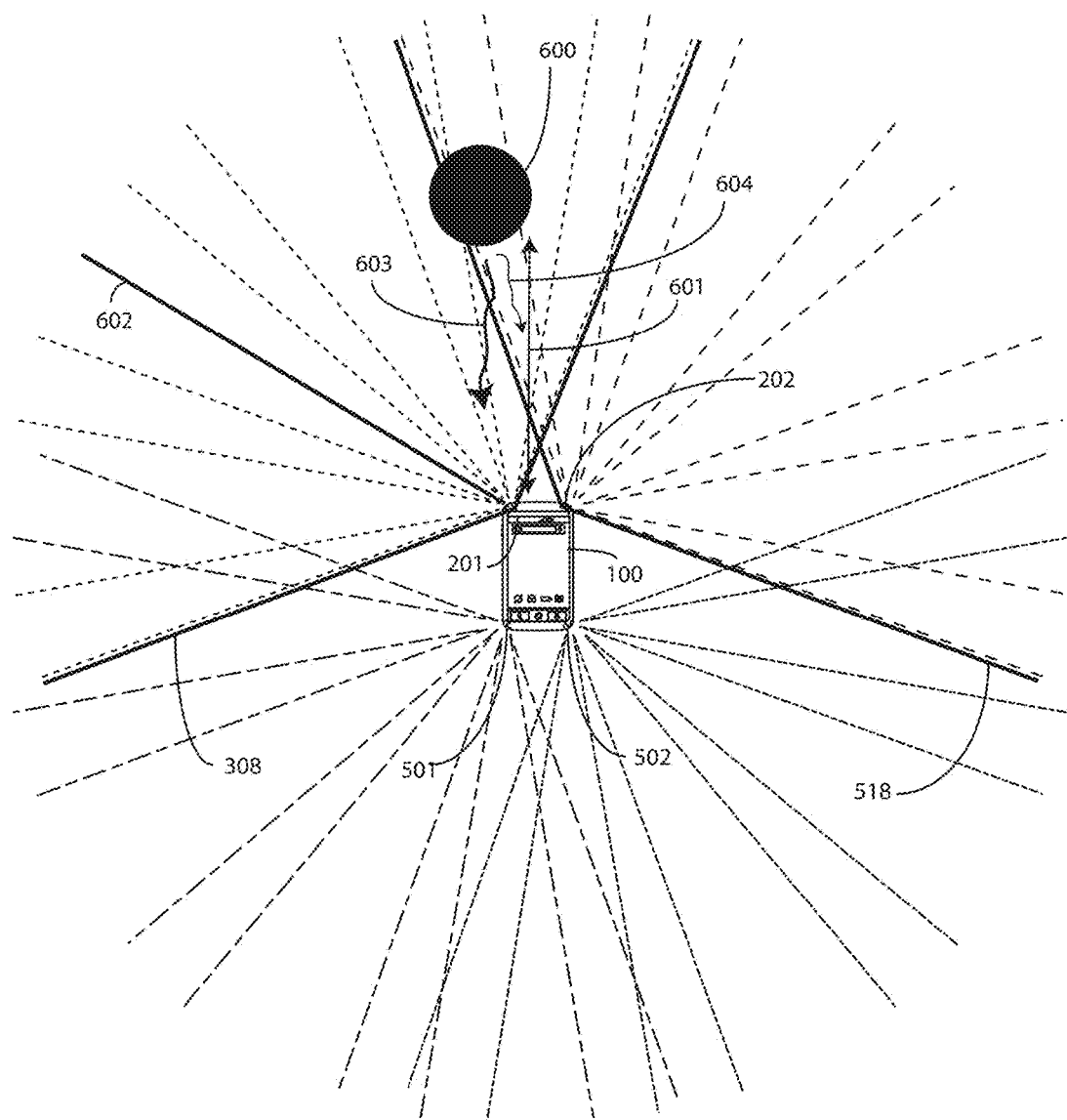
FIG. 6 illustrates one explanatory method of determining object location with one or more proximity sensors in accordance with one or more embodiments of the disclosure.

Turning now to FIG. 6, by detecting the strength of infrared emissions (for stationary person or moving person), the one or more processors (116) can determine one or more of the distance 601 a person may be from the electronic device 100 and/or a more precise location of that person. As shown in FIG. 6, a single person 600 is within a thermal reception radius 602 of the electronic device 100. The single person 600 is standing within both cumulative beam reception angle 308 and cumulative beam reception angle 518. However, the person 600 is located more centrally within, i.e., inside and more to the center of, cumulative beam reception angle 308 than cumulative beam reception angle 518, where the user is right at the edge. Accordingly, infrared emissions 603 received by proximity sensor component 201 will be stronger than infrared emissions 604 received by proximity sensor component 202. Using this information, the one or more processors (116) can determine more precisely the location of the person 600. Additionally, the strength of the infrared emissions 603,604 can be used to determine the distance 601 the person 600 is from the electronic device 100 as well.

Figure 7:
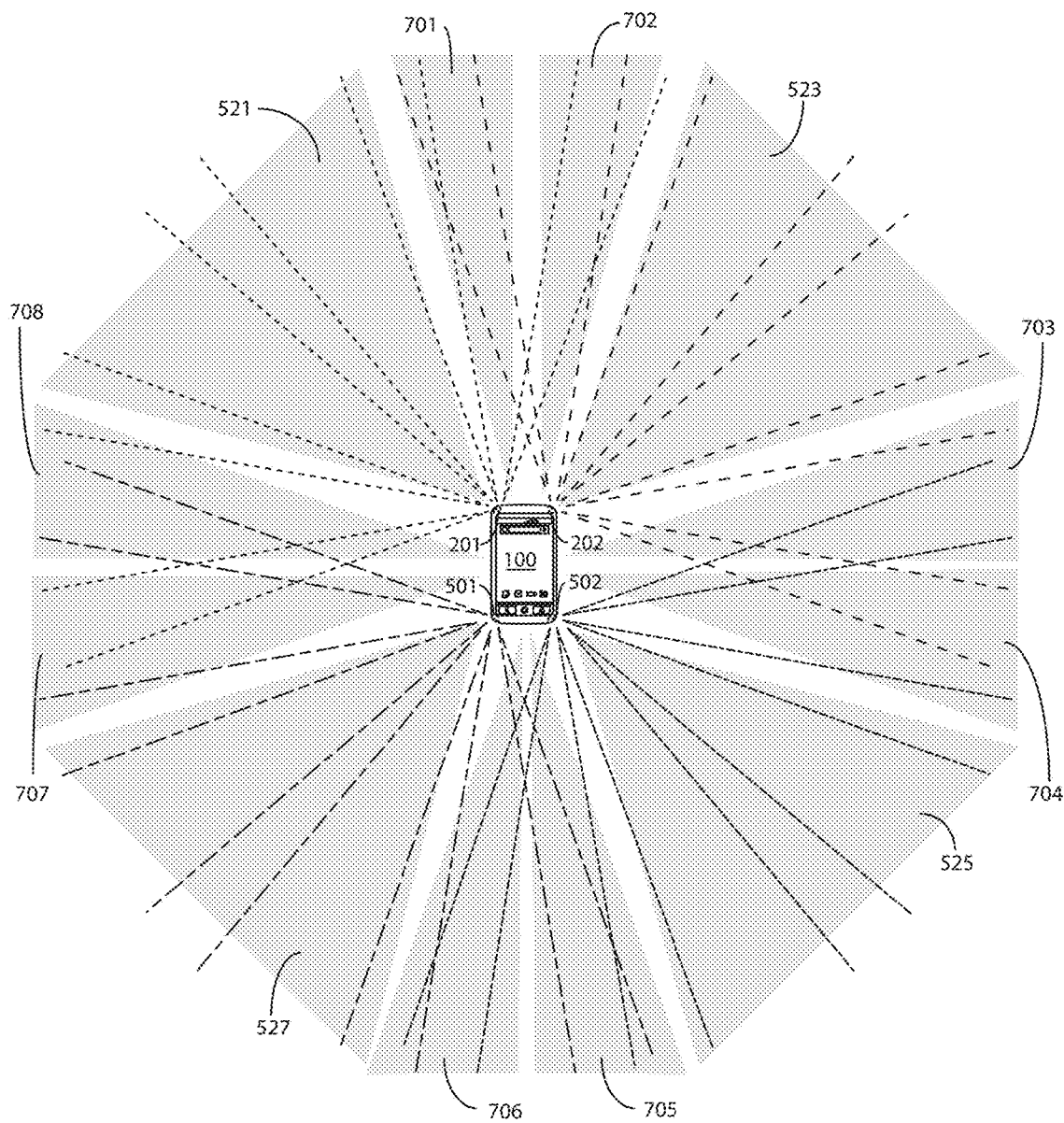
FIG. 7 illustrates another explanatory electronic device having a plurality of proximity sensor components disposed about a perimeter of a device housing, with each proximity sensor component defining a plurality of reception beams having a cumulative reception angle, where at least some reception beams overlap between sensors in accordance with one or more embodiments of the disclosure.

As shown in FIG. 7, this optional signal strength measurement can be used to create four additional zones. In FIG. 7, zones 521,523,525,527 all stay the same, i.e., occur where only a single proximity sensor component 201,202,501,502 receives an infrared emission. However, previous zones (522,524,526,528) have been divided into zones 701,702, 703,704,705,706,707, 708 in which one proximity sensor component receives a stronger signal than the other. For example, zone 701 occurs for the situation described above with reference to FIG. 6, namely where infrared emissions (603) received by proximity sensor component 201 are stronger than infrared emissions (604) received by proximity sensor component 202. Zone 702 is the corollary of this case, namely where infrared emissions received by proximity sensor component 201 are weaker than those received by proximity sensor component 202. A similar analysis can be applied to each zone 521,523, 525, 527,701,702,703,704, 705,706,707,708.

Thus, by determining which proximity sensor component receives the infrared emission, or where two proximity sensor components receive an emission which one receives the stronger emission, the one or more processors (116) can determine more precisely where a person or persons may be located about the electronic device 100. Said differently, in one embodiment, the one or more processors (116) are operable to determine which proximity sensor component of the plurality of proximity sensor components receives a stronger infrared emission to determine a location of a single person or a plurality of people relative to the housing (101) of the electronic device 100.

Distance from the electronic device 100 device can be determined from the magnitude of the received emission as well. In one or more embodiments, the one or more processors (116) of the electronic device 100 are operable to determine a magnitude of the infrared emission to determine a distance (601) of a single person or a plurality of people relative to the housing (101) of the electronic device 100.

Figure 8:
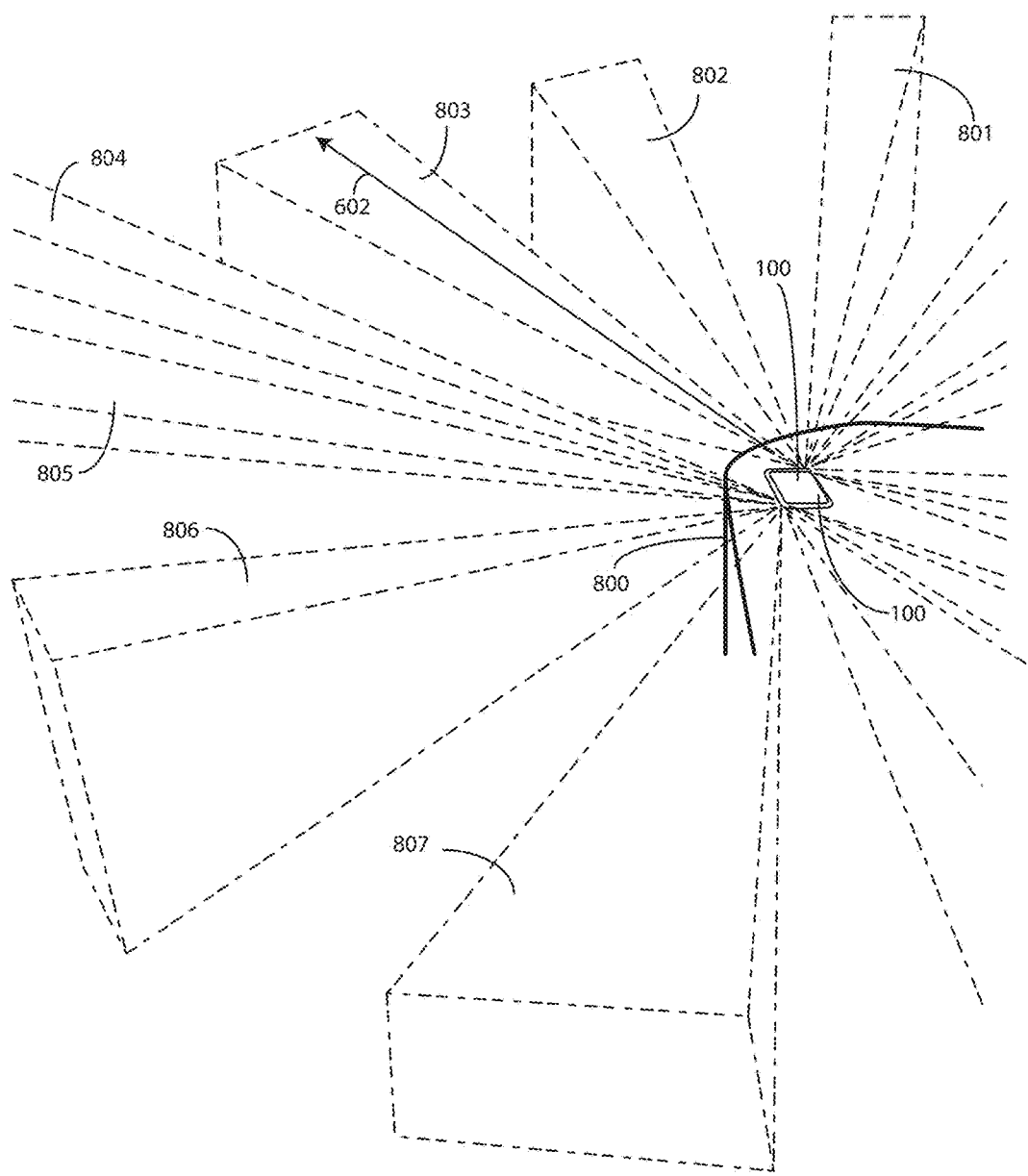
FIG. 8 illustrates one explanatory electronic device comprising one or more proximity sensor components comprising infrared signal receivers in accordance with one or more embodiments of the disclosure.
Figure 9:
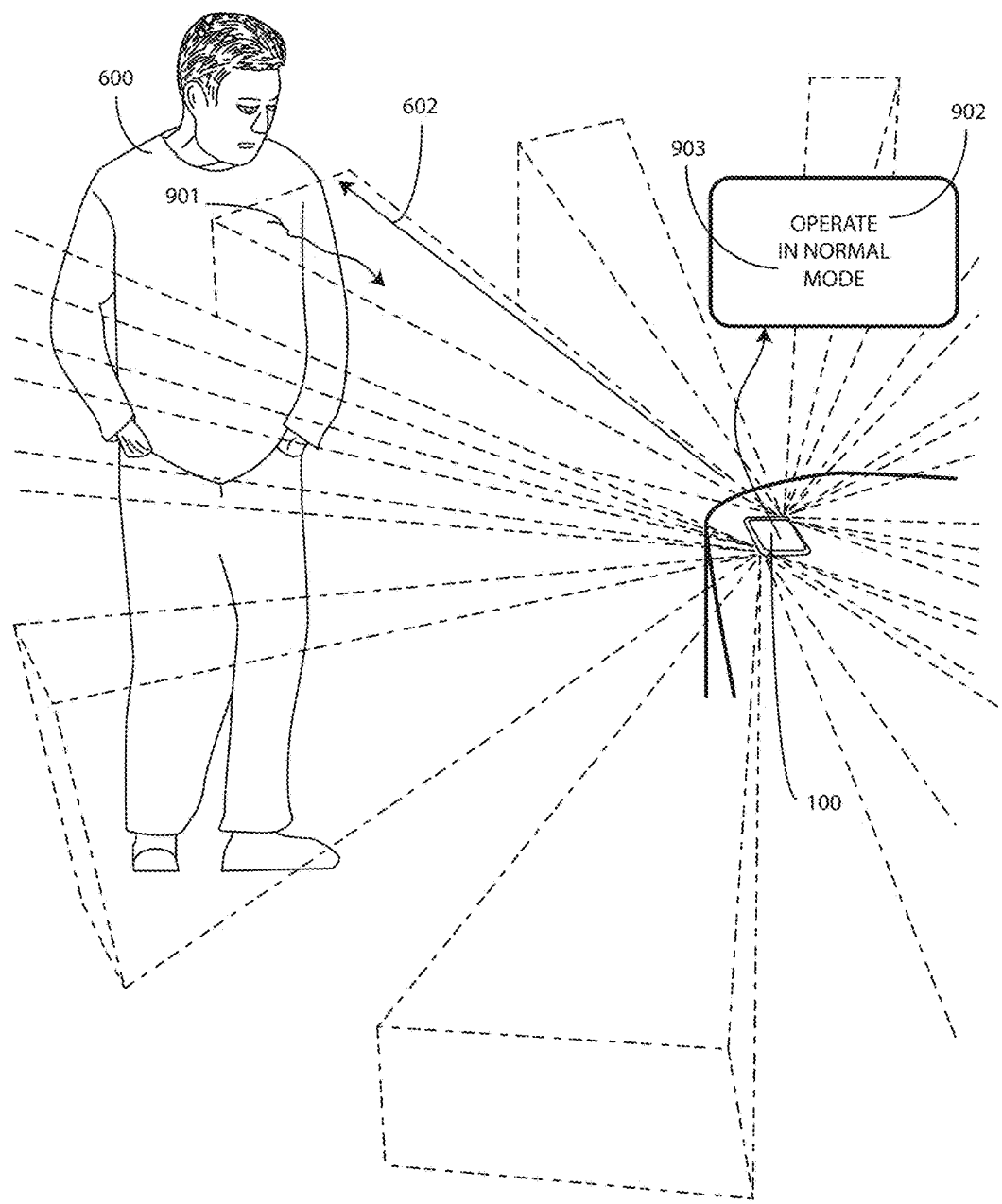
FIG. 9 illustrates the explanatory device of FIG. 8 receiving an infrared emission from an object external to the housing and executing one or more method steps, each in accordance with one or more embodiments of the disclosure.
Figure 10:
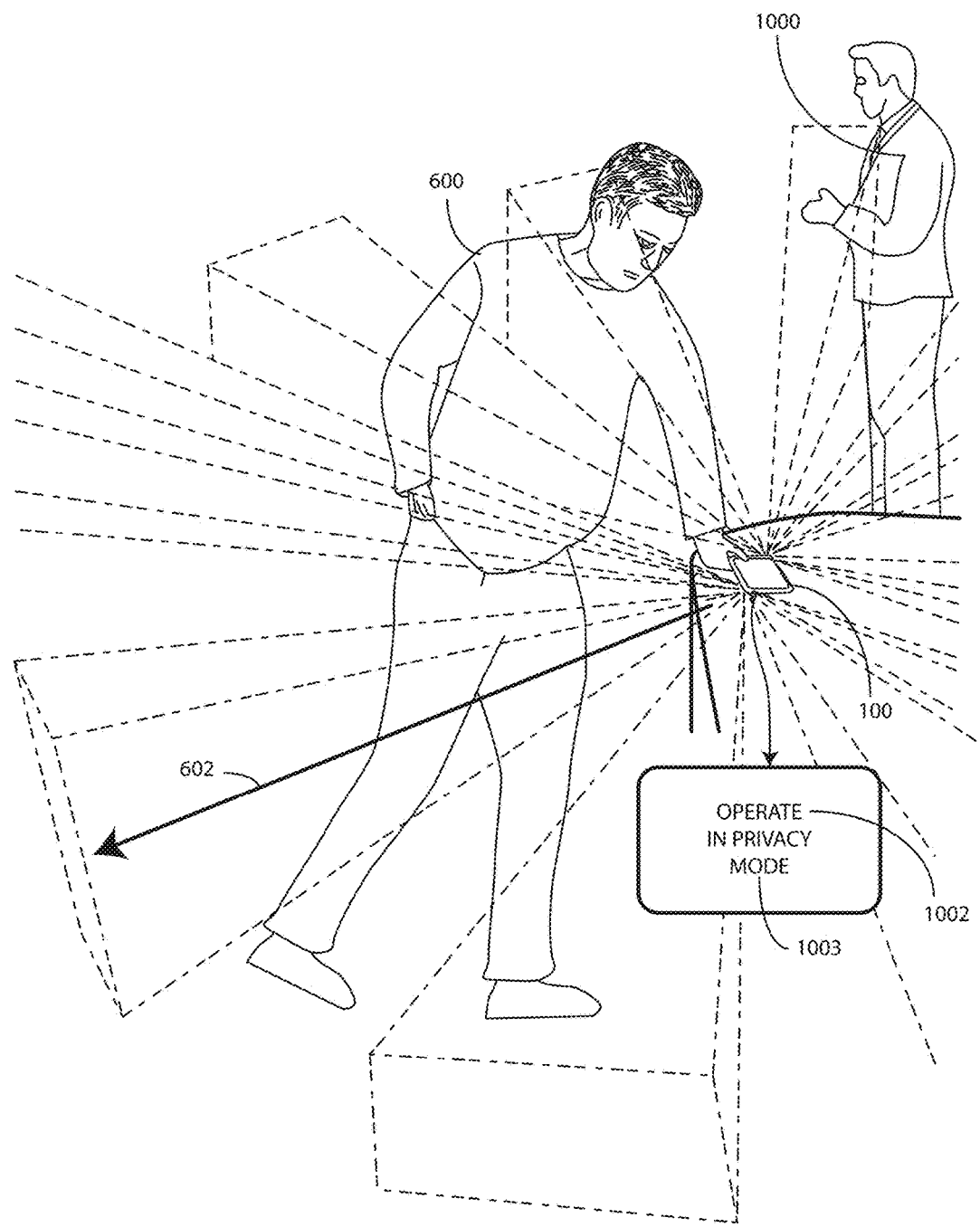
FIG. 10 illustrates the explanatory device of FIG. 8 detecting multiple objects disposed near the housing and executing one or more additional method steps in accordance with one or more embodiments of the disclosure.

Explanatory use cases to illustrate the operation of the electronic device 100 are shown generally in FIGS. 8-10, with additional features shown in FIGS. 11-14. Beginning with FIG. 8, the electronic device 100 is on a table. The electronic device 100 may be in a low-power or sleep mode. However, the plurality of proximity sensor components (140) are active to receive infrared emissions in one or more reception beams 801,802,803,804,805,806,807 from a distance indicated by thermal reception radius 602. As described above with reference to FIGS. 5 and 7, some of the reception beams 801,802,803,804,805,806,807 will comprise reception beams from multiple proximity sensor components, while others will be associated with a single proximity sensor component.

The one or more proximity sensor components (140) are actively waiting to receive infrared emissions from an object external to the housing (101) of the electronic device 100. In this embodiment, the reception beams 801,802,803,804,805, 806,807 define a 360-degree reception area or heat sensor coverage zone about the device with a thermal reception radius 602 of about ten feet. As no person is within this thermal reception radius 602, power consumption within the electronic device 100 can remain extremely low.

Turning now to FIG. 9, a single person 600 enters the thermal reception radius 602. The user's body heat results in an infrared emission 901 being delivered to one or more proximity sensor components (140) of the electronic device 100. When this occurs, the one or more processors (116) are operable to detect that the single person 600 is the only person within the thermal reception radius 602. Accordingly, the one or more processors (116) can operate 902 the electronic device 100 in a normal mode 903 of operation. As noted above, in one embodiment the normal mode 903 of operation is one in which no restrictions are placed upon access to information from the electronic device 100.

By contrast, as shown in FIG. 10 the single person 600 and another person 1000 are disposed within the thermal reception radius 602. When this occurs, the one or more processors (116) are operable to detect that a plurality of people is within the thermal reception radius 602. Accordingly, the one or more processors (116) can operate 1002 the electronic device 100 in a privacy mode 1003 of operation. As noted above, in one embodiment the privacy mode 1003 of operation is one in which one or more restrictions are placed upon access to information from the electronic device 100. For example, despite the fact that the single person 600 is grasping the device, one or more informational access restrictions may be applied so that the other person 1000 does not eavesdrop or otherwise become privy to such information.

Advantageously, one or more embodiments of the disclosure conveniently cause the electronic device 100 to enter the privacy mode 1003 without drawing attention to the user, here the single person 600, and without requiring the user to delivering any touch input or voice input. Accordingly, the user is assured that the other person 1000 will not hear or see private information, such as medical diagnosis, breakup messages, or other sensitive information or any information the user previously labeled as private or sensitive. As noted above, these restrictions are only explanatory examples. Others will be readily obvious to those of ordinary skill in the art having the benefit of this disclosure.

In one or more embodiments, the information access restrictions are user definable. For example, a user may desire the ability to read private information to be OFF when the other person 1000 is within the thermal reception radius 602, while desiring the ability to show pictures to the other person 1000 to be ON. Similarly, the user may want the presentation of private information to be precluded, while allowing the presentation of public information. For example, the user may want to preclude the presentation of a text message sent from a friend, while allowing the presentation of a publicly available stock quote. In yet another embodiment, the user may want some information to be presented on certain portions of the display, while precluding the presentation of information on portions of the display visible to the other person 1000. The one or more processors (116) may therefore present information on some portions of the display while leaving other portions blank. Such an embodiment is useful for privacy modes of operation when the user wants information to be present only on portions of the electronic device 100 oriented towards or facing them. Other configurations will be obvious to those of ordinary skill in the art having the benefit of this disclosure.

Figure 11:
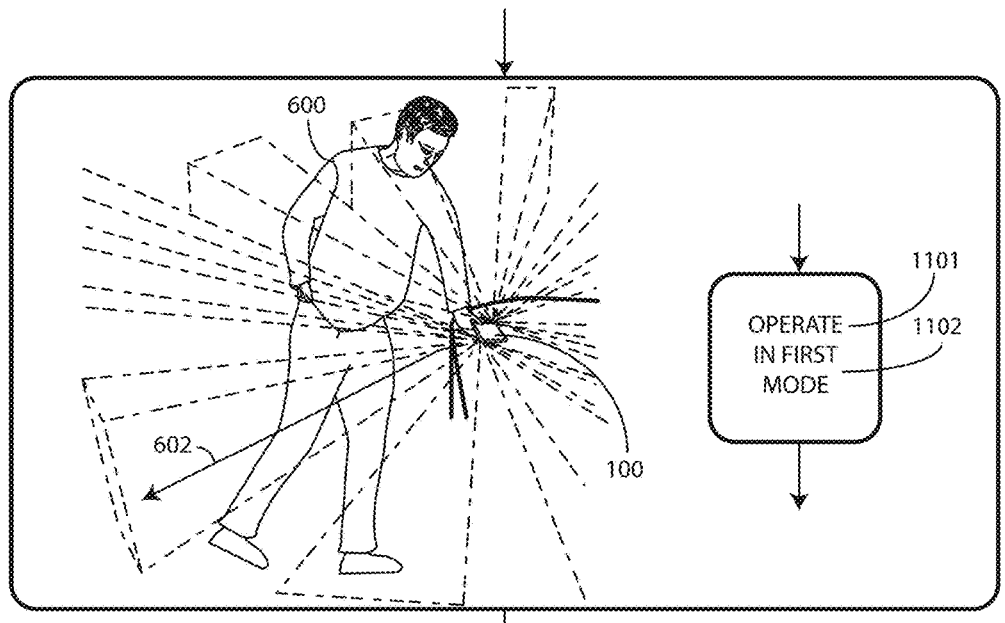
FIG. 11 illustrates an electronic device and corresponding method steps in accordance with one or more embodiments of the disclosure.
Figure 12:
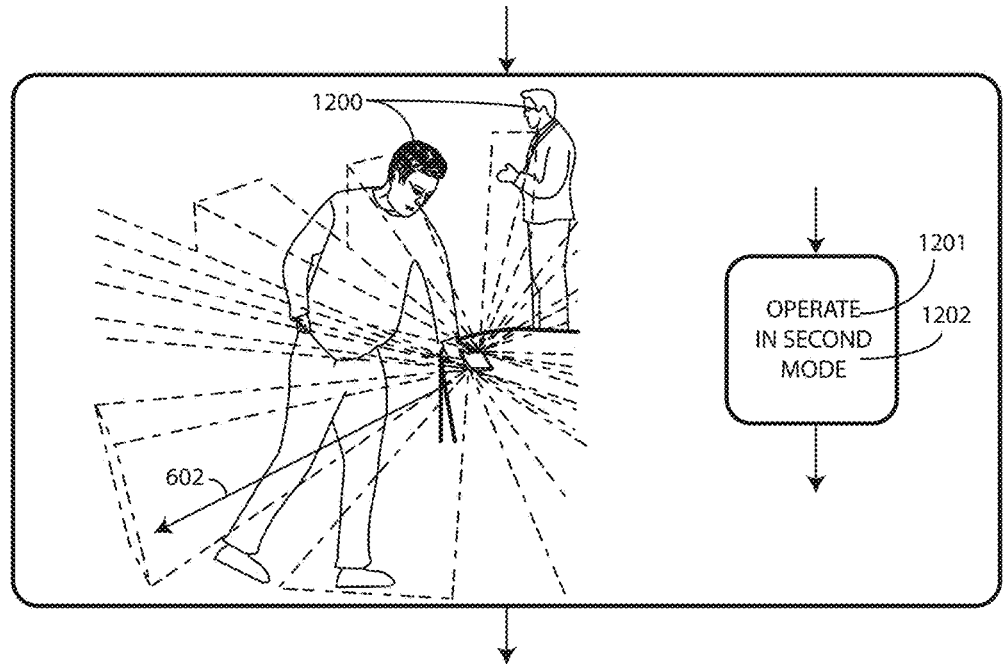
FIG. 12 illustrates an electronic device and corresponding method steps in accordance with one or more embodiments of the disclosure.

Turning to FIGS. 11 and 12, the general operation of an electronic device 100 is summarized. Beginning with FIG. 11, the single person 600 is within the thermal reception radius 602. When this occurs, the one or more processors (116) are operable to detect that the single person 600 is the only person within the thermal reception radius 602. Accordingly, the one or more processors (116) can operate 1101 the electronic device 100 in a first mode 1102 of operation. By contrast, as shown in FIG. 12, a plurality 1200 of people is within the thermal reception radius 602. Accordingly, the one or more processors (116) can operate 1201 the electronic device 100 in a second mode 1202 of operation that is different from the first mode (1102) of operation.

Figure 13:
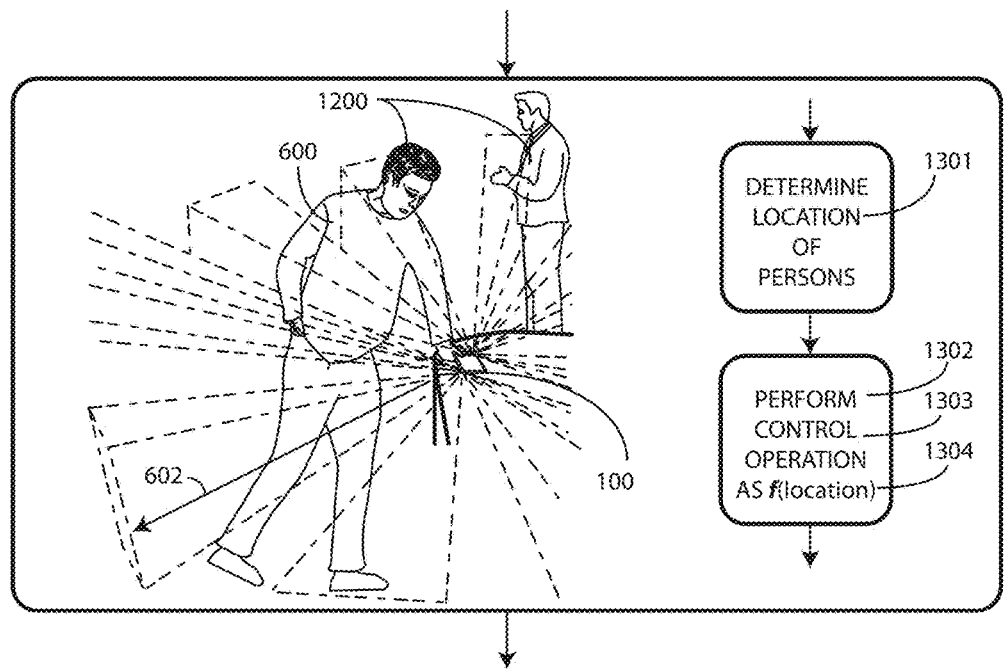
FIG. 13 illustrates an electronic device and corresponding method steps in accordance with one or more embodiments of the disclosure.

Other functions can be performed as well. Turning to FIG. 13, when the single person 600 or the plurality 1200 of people are within the thermal reception radius 602, in one embodiment the one or more processors (116) are operable to determine a location 1301 of single person 600 or the plurality 1200 of people relative to the housing (101) of the electronic device 100. In one or more embodiments, the one or more processors (116) can then execute 1302 a control operation 1303 as a function 1304 of the location 1301.

For example, the control operation 1303 may be a security operation that precludes the presentation of at least some information on the display (102) of the electronic device 100. Other security operations include presenting an alert of incoming messages on the display (102), while precluding the content of messages from being presented on the display (102), disabling the presentation of some or all text messages or chat messages, locking the display (102), allowing access to non-sensitive information while precluding access to sensitive or private information, overriding location sensors and beacons, presenting message and electronic mail subjects only on the display (102) while preventing the presentation of message or electronic mail content, or transitioning a voice control interface engine operating in the electronic device 100 between a normal mode of operation and a discrete mode of operation. The examples above of security operations are illustrative only. Others will be readily obvious to those of ordinary skill in the art having the benefit of this disclosure.

Figure 14:
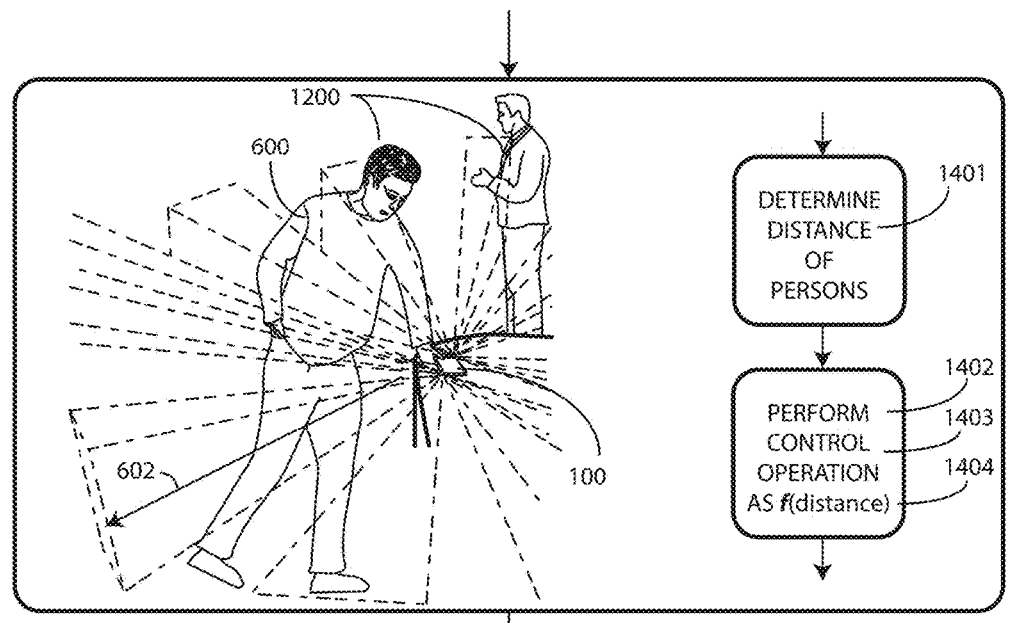
FIG. 14 illustrates an electronic device and corresponding method steps in accordance with one or more embodiments of the disclosure.

Turning now to FIG. 14, in one embodiment when the single person 600 or the plurality 1200 of people are within the thermal reception radius 602, the one or more processors (116) are operable to determine a distance 1401 of single person 600 or the plurality 1200 of people relative to the housing (101) of the electronic device 100. In one or more embodiments, the one or more processors (116) can then execute 1402 a control operation 1403 as a function 1404 of the distance 1401. Examples of possible control operations 1403 were listed in the preceding paragraph. Still others will be obvious to those of ordinary skill having the benefit of this disclosure.

Figure 15:
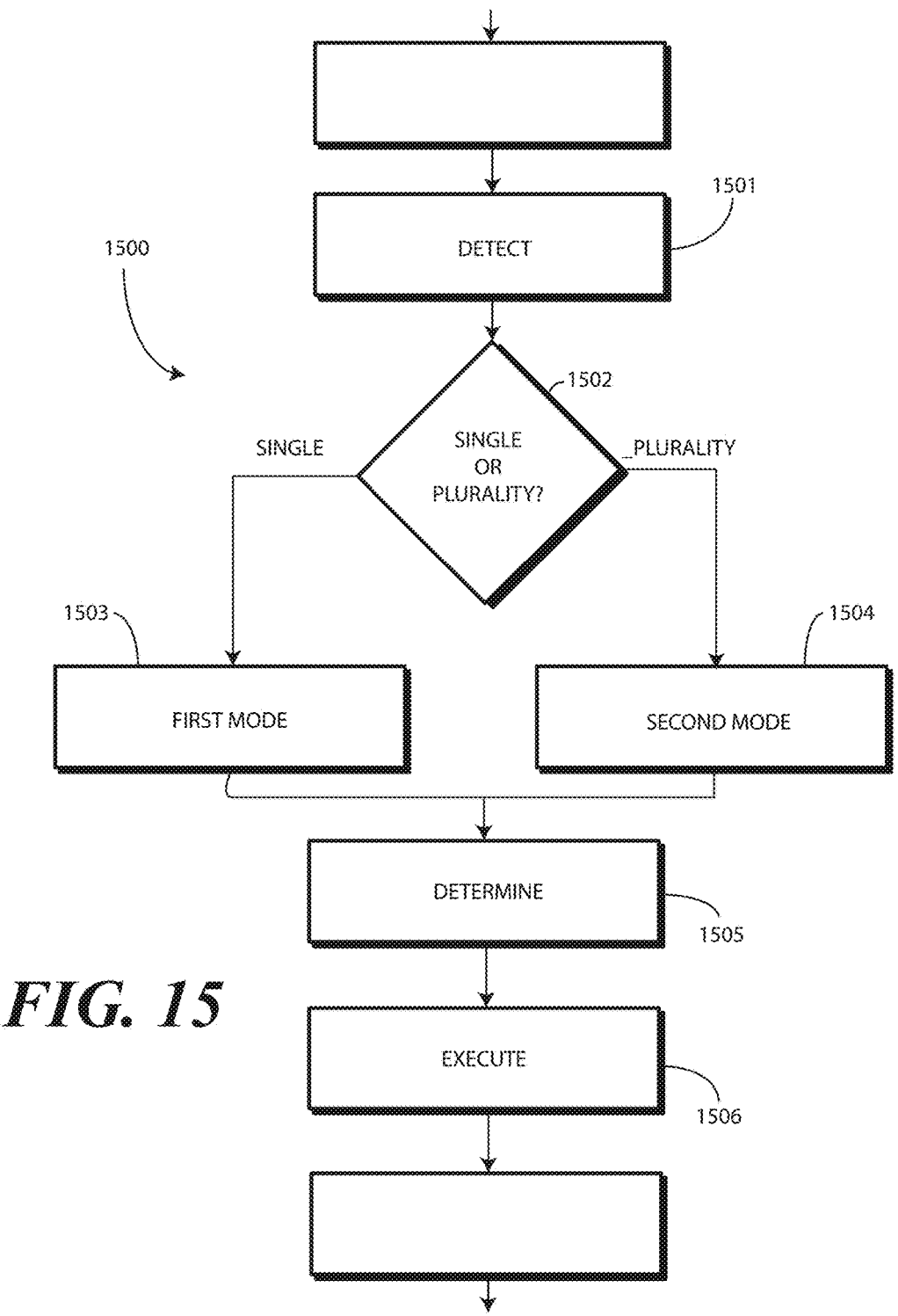
FIG. 15 illustrates an explanatory method in accordance with one or more embodiments of the disclosure.

Turning now to FIG. 15, illustrated therein is one explanatory method 1500 for controlling an electronic device having one or more proximity sensor components and one or more processors operable with the one or more proximity sensor components. Many of the method steps have been described above with reference to the apparatus and system components, and thus will only be described briefly here.

At step 1501, the method 1500 detects, with a plurality of proximity sensor components, one or more persons within a thermal reception radius of the electronic device. In one embodiment, each proximity sensor component comprises an infrared signal receiver to receive an infrared emission from one or more of the single person or the plurality of people. In one embodiment, the infrared signal receiver is disposed behind a grill defining a plurality of reception beams having a beam reception angle, where the beam reception angle of any one proximity sensor component overlaps the beam reception angle of at least one other proximity sensor component. In one embodiment, the beam reception angle of the any one proximity sensor component overlaps the beam reception angle of at least two other proximity sensor components.

At decision 1502, the method 1500 determines whether a single person or a plurality of people is within the thermal reception radius. In one embodiment, this decision 1502 includes determining whether one proximity sensor component or multiple proximity sensor components receives the infrared emission to determine a location of the single person or the plurality of people relative to the electronic device. In one embodiment, the decision 1502 includes determining which proximity sensor component of the plurality of proximity sensor components receives a stronger infrared emission to determine the location of the single person or the plurality of people relative to the electronic device.

When the single portion is within the thermal reception radius, at step 1503 the method 1500 performs, by one or more processors operable with the plurality of proximity sensor components, a control operation to operate the electronic device in a normal mode of operation. By contrast, when the plurality of people are within the thermal reception radius, at step 1504 the method 1500 performs another control operation to operate the electronic device in a privacy mode of operation.

In one embodiment, the privacy mode of operation occurring at step 1503 comprises precluding presentation of messages on a display of the electronic device. In another embodiment, the privacy mode of operation occurring at step 1503 comprises locking a display of the electronic device.

In one or more embodiments, at step 1505 the method 1500 can determine a magnitude of the infrared emission to determine a distance of the single person or the plurality of people relative to the electronic device. At step 1506, the method 1500 can execute a second control operation as a function of the distance. Examples of the control operation have been previously described.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
   a housing;
   one or more processors;
   a plurality of proximity sensor components operable with the one or more processors, each proximity sensor component:
      comprising an infrared signal receiver to receive an infrared emission from an object external to the housing; and
      disposed about a perimeter of the housing and behind a grille defining a plurality of reception beams having a cumulative beam reception angle;
      the cumulative beam reception angle of any one proximity sensor component overlapping the cumulative beam reception angle of at least one other proximity sensor component;
   the one or more processors operable to:

detect, with the plurality of proximity sensor components, whether a single person or a plurality of people are within a thermal reception radius of the electronic device; and where the single person is within the thermal reception radius, operate the electronic device in a first mode of operation; and where the plurality of people is within the thermal reception radius, operate the electronic device in a second mode of operation.

2. The electronic device of claim 1, the first mode of operation comprising a normal mode of operation, the second mode of operation comprising a privacy mode of operation.

3. The electronic device of claim 1, the cumulative beam reception angle of the each proximity sensor component greater than ninety degrees.

4. The electronic device of claim 3, the cumulative beam reception angle of the any one proximity sensor component overlapping the cumulative beam reception angle of at least two other proximity sensor components.

5. The electronic device of claim 4, the plurality of proximity sensor components comprising four proximity sensor components disposed at corners of the housing, respectively.

6. The electronic device of claim 4, the one or more processors further to determine whether a single proximity sensor component or multiple proximity sensor components receives the infrared emission to determine a location of the single person or the plurality of people relative to the housing.

7. The electronic device of claim 4, the one or more processors to determine which proximity sensor component of the plurality of proximity sensor components receives a stronger infrared emission to determine a location of the single person or the plurality of people relative to the housing.

8. The electronic device of claim 4, the one or more processors to determine a magnitude of the infrared emission to determine a distance of the single person or the plurality of people relative to the housing.

9. The electronic device of claim 8, the one or more processors to execute a control operation as a function of the distance.

10. The electronic device of claim 9, the electronic device comprising a display, the control operation comprising precluding presentation of at least some information on the display.

11. The electronic device of claim 9, the control operation comprising a security operation of the electronic device.

12. A method for controlling an electronic device, comprising:
    detecting, with a plurality of proximity sensor components, whether a single person or a plurality of people are within a thermal reception radius of the electronic device; and
    performing, by one or more processors operable with the plurality of proximity sensor components:
        a control operation to operate the electronic device in a normal mode of operation when the single person is within the thermal reception radius; and
        another control operation to operate the electronic device in a privacy mode of operation when the plurality of people is within the thermal reception radius.

13. The method of claim 12, the privacy mode of operation comprising precluding presentation of messages on a display of the electronic device.

14. The method of claim 12, the privacy mode of operation comprising locking a display of the electronic device.

15. The method of claim 12, each proximity sensor component comprising an infrared signal receiver to receive an infrared emission from one or more of the single person or the plurality of people, the infrared signal receiver disposed behind a grill defining a plurality of reception beams having a beam reception angle, where the beam reception angle of any one proximity sensor component overlaps the beam reception angle of at least one other proximity sensor component.

16. The method of claim 15, wherein the beam reception angle of the any one proximity sensor component overlaps the beam reception angle of at least two other proximity sensor components.

17. The method of claim 16, further comprising determining whether one proximity sensor component or multiple proximity sensor components receives the infrared emission to determine a location of the single person or the plurality of people relative to the electronic device.

18. The method of claim 17, further comprising determining which proximity sensor component of the plurality of proximity sensor components receives a stronger infrared emission to determine the location of the single person or the plurality of people relative to the electronic device.

19. The method of claim 17, further comprising determining a magnitude of the infrared emission to determine a distance of the single person or the plurality of people relative to the electronic device.

20. The method of claim 19, further comprising executing a second control operation as a function of the distance.

\* \* \* \* \*